United States Patent
Takahashi et al.

(10) Patent No.: US 6,497,910 B2
(45) Date of Patent: *Dec. 24, 2002

(54) OIL ABSORPTION RETARDER

(75) Inventors: Kozo Takahashi, Tokyo (JP); Tsukasa Sugiura, Tokyo (JP); Toshio Takeuchi, Tokyo (JP)

(73) Assignee: Kibun Food Chemifa Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,355

(22) Filed: Oct. 5, 1999

(65) Prior Publication Data

US 2002/0001659 A1 Jan. 3, 2002

Related U.S. Application Data

(63) Continuation-in-part of application No. 09/237,867, filed on Jan. 27, 1999, now abandoned.

(30) Foreign Application Priority Data

Nov. 4, 1998 (JP) .......................................... 10-313110

(51) Int. Cl.$^7$ ........................ A23L 1/053; A23L 1/217; A23P 1/08
(52) U.S. Cl. ...................... 426/438; 426/439; 426/302; 426/89; 426/575; 426/305; 426/549; 426/557
(58) Field of Search ............................... 426/438, 439, 426/302, 531, 89, 92, 94, 549, 552, 555, 557, 575, 653, 654, 293, 296, 297, 305

(56) References Cited

U.S. PATENT DOCUMENTS

| | | | | |
|---|---|---|---|---|
| 2,494,911 A | * | 1/1950 | Steiner et al. | 536/3 |
| 2,659,675 A | * | 11/1953 | Steiner et al. | 426/590 |
| 3,574,641 A | * | 4/1971 | O'Connell | 426/602 |
| 3,873,749 A | * | 3/1975 | Carpenter et al. | 426/350 |
| 4,395,426 A | * | 7/1983 | Fan | 426/62 |
| 4,504,502 A | * | 3/1985 | Earle et al. | 426/293 |
| 4,664,932 A | * | 5/1987 | Yamaguchi et al. | 426/653 |
| 4,767,635 A | * | 8/1988 | Merritt et al. | 426/272 |
| 4,808,707 A | * | 2/1989 | Daly et al. | 536/3 |
| 4,837,037 A | * | 6/1989 | Kirsop et al. | 426/303 |
| 4,900,573 A | * | 2/1990 | Meyers et al. | 426/302 |
| 5,217,736 A | * | 6/1993 | Feeney et al. | 426/102 |
| 5,580,595 A | * | 12/1996 | Bows et al. | 426/244 |
| 5,676,964 A | * | 10/1997 | Della Valle et al. | 424/423 |
| 5,759,607 A | * | 6/1998 | Chawan et al. | 426/557 |
| 5,801,116 A | * | 9/1998 | Cottrell et al. | 502/404 |
| 5,807,603 A | * | 9/1998 | Lerchenfeld et al. | 426/559 |
| 6,290,999 B1 | * | 9/2001 | Gerrish et al. | 426/302 |

FOREIGN PATENT DOCUMENTS

| | | |
|---|---|---|
| EP | 0 487 340 A1 | 5/1992 |
| EP | 0 738 473 A2 | 10/1996 |
| JP | 02000342210 * | 12/2000 |
| WO | WO 99 65331 A1 | 12/1999 |

OTHER PUBLICATIONS

ISP Alginates Reference Guide (obtained from www.ispcorp.com/products/ref.html ).*

Database Food Science & Technology 'online!, Abstract XP002170565 of "Research Report No. 705: Hydrocolloid films as barriers to oil absorption in deep–fried foods. Part II. Testing films on model systems", 1993.

Patent Abstracts of Japan of "JP 57 166946 A, applicant Fushimi Takao, published Oct. 14, 1982".

Patent Abstracts of Japan of JP 10 327787 A, applicant Okuno Chem Ind Co Ltd, published Dec. 15, 1998.

Database WPI, Derwent Publications, Abstract XP002170566 of "JP 05 186356 A applicant Kirin Brewery KK, Published Jul. 27, 1993".

* cited by examiner

Primary Examiner—Milton J. Cano
Assistant Examiner—Robert Madsen
(74) Attorney, Agent, or Firm—Browdy and Neimark, P.L.L.C.

(57) ABSTRACT

An oil absorption retarder containing alginic ester and fried foods produced by using the oil absorption retarder. The oil absorption retarder of this invention can efficiently retard oil absorption during frying, which results in providing fried foods with lowered oil contents.

23 Claims, No Drawings

OIL ABSORPTION RETARDER

This is a continuation-in-part of application Ser. No. 09/237,867, filed on Jan. 27, 1999, now abandoned.

BACKGROUND OF THE INVENTION

1. Field of the Invention

This invention relates to an oil absorption retarder capable of retarding oil absorption during frying and fried foods with lowered oil contents.

2. Related Art

Fried foods, referred as to foods produced by frying, are widely favored as foods supporting the modern people's diet. Fried foods are widely sold at, for example, fast food shop, confectionery, bakery, cake shop, lunch shop, convenience store and supermarket, with a large variety such as doughnut, fried potato, fried chicken, tempura (Japanese deep-fat fried food), and piroshki.

Although these miscellaneous foods, discriminated by their specific texture, have been accepted by many consumers, still further needs reside in improving the texture to soar the sales. It is exceptionally important for fried foods to control their oil contents in a proper range since too much oil contents will seriously ruin the texture. It is also expected to provide foods meeting needs of consumers since they tend to reduce oil intake in the recent health-oriented boom.

It is, from another aspect, needed to use oils efficiently since the oils used for producing fried foods are expensive relative to other food materials and liable to degrade. It is most strictly needed for confectionery producing factory or fast food shop, producing a huge quantity of fried foods, to yield a maximum count of fried foods with a minimum amount of the oils.

Dough, a material for fried foods, however tends to absorb an unnecessarily large amount of oil when fried, which fails to meet the above needs. It is thus strongly needed to provide means for retarding oil absorption by dough.

The present inventors aimed to meet the above needs encountered in the prior art. It is therefore an object of the present invention to provide an oil absorption retarder capable of retarding oil absorption during frying. It is another object of the present invention to provide fried foods with lowered oil contents and improved texture.

SUMMARY OF THE INVENTION

From thorough investigations to solve the above problems, the present inventors found that alginic ester has oil absorption retarding property to complete the present invention.

That is, this invention is to provide an oil absorption retarder containing alginic ester, Alginic ester used in this invention preferably has a degree of esterification of 20% or above and a viscosity of 2 cp or above in the state of 1% aqueous solution at 20° C. The oil absorption retarder of this invention may include flour, in which alginic ester is preferably contained at a ratio of 0.01 wt % or above for 100 weight parts of flour, and more preferably at 0.01 to 3 wt %.

This invention also provides fried foods produced using the above oil absorption retarder.

DETAILED DESCRIPTION OF THE INVENTION

Alginic ester used for the oil absorption retarder of this invention is selected from compounds having a structure in which at least a part of carboxylic groups composing the alginic acid is converted into esters. There is no particular limitation on molecular weight, structure or degree of esterification, There is also no particular limitation on ratio or sequence of β-D-mannuronic acid and α-L-guluronic acid, both of which can be components of alginic ester. Thus an acceptable alginic ester includes such that having all of blocks consisting of β-D-mannuronic acid only, blocks consisting of α-L-guluronic acid only and blocks consisting of the both, or such that having either one or two blocks.

Preferable compound relates to alginic ester with a degree of esterification of 20% or above. It is, in particular, preferable to use alginic ester with a degree of esterification of 40% or higher, more particularly, 50 to 90%. Viscosity in the state of 1% aqueous solution at 20° C. is preferably 2 cp or above, and more preferably falls within a range between 20 and 600 cp.

Alginic ester used in this invention may be originated from natural products or from synthetic products. When obtaining it from natural products, it is preferable to extract alginic acid from seaweed or so, which is followed by esterification. In more details, brown algae rich in high-molecular-weight alginic acid is washed with, for example, dilute sulfuric acid, extracted with sodium carbonate solution, precipitated with sulfuric acid to obtain high-molecular-weight alginic acid, and then esterified according to the conventional method to obtain alginic ester. Alternatively, brown algae is washed with, for example, dilute mineral acid such as dilute sulfuric acid or dilute hydrochloric acid, extracted with alkali solution such as sodium carbonate solution, and precipitated with calcium salt such as calcium chloride to obtain calcium alginate. The calcium alginate is subsequently subject to removal of calcium by dilute mineral acid such as dilute sulfuric acid or dilute hydrochloric acid to obtain high-molecular-weight alginic acid, and the resultant alginic acid is then esterified according to the conventional method to obtain alginic ester. Low-molecular-weight alginic ester can be obtained either by esterifying high-molecular-weight alginic acid after decomposed into low-molecular-weight one, or by decomposing high-molecular-weight alginic acid after esterified. Possible methods for decomposing alginic acid into low-molecular-weight one include a method based on enzyme processing of high-molecular-weight alginic acid, a method based on reaction with sodium hypochlorite or hydrogen peroxide, a method based on thermal decomposition, and a method based on pressurized decomposition.

Alginic ester used in this invention may contain functional groups or crosslinked structure as far as desired effects will not exceedingly be interfered. The alginic ester may have a form mixed with alginic acid, alginic acid salt or other alginic acid derivatives. The oil absorption retarder may further contain other components as far as desired effects will not exceedingly be interfered.

An oil absorption retarder comprising alginic ester mixed with flour is exemplified as the one applicable to fried food containing flour as its component. In this case, alginic ester content is preferably set at 0.01 wt % or above for 100 weight parts of flour, more preferably at 0.01 to 3 wt % and still more preferably at 0.05 to 1 wt %.

The oil absorption retarder of this invention also allows organic acid salts, besides flour, to be added. Organic acid salts allowable to be added include sodium citrate, potassium citrate, calcium citrate, sodium acetate, sodium ascorbate, sodium lactate, calcium lactate, sodium sulfate, potassium sulfate, calcium sulfate, potassium carbonate, sodium carbonate, calcium carbonate and calcium glycerophosphate.

The oil absorption retarder of this invention also allows polysaccharide to be added. Polysaccharide allowable to be added include alginic acid, sodium alginate, pectin, carboxymethyl cellulose, carrageenan, guar gum, curdlan, starch, gum arabic, welan gum, cassia gum, xanthan gum, chitosan, psyllium seed gum, gellan gum, tamarind seed gum, dextran, furcellaran, pullulan and hyaluronic acid.

The oil absorption retarder of this invention also allows proteins to be added. Proteins allowable to be added include egg albumen, wheat gluten, and soybean protein.

These additional components may be added independently or in combination of a plurality of them. The additional components can properly be selected depending on the object matter to which the components are to be applied.

For fried foods using shaped dough such as instant noodle or doughnut, exemplified is a powder type oil absorption retarder comprising alginic ester mixed with flour, or a liquid-type oil absorption retarder dissolving these components into water. For fried foods such as fries, i.e. so-called "French fries" or fried potato strips, tempura, fried chicken, nugget, and American dog (sausage covered with fried dough) produced by dipping raw materials into batter or those applied with bread crumb or the like, an oil absorption retarder comprising batter added with alginic ester can be used. For fried foods such as fried potato or potato chips, produced by directly frying raw materials, alginic ester dissolved into water may be used as an oil absorption retarder through coating or the like.

There is no specific limitation on the form of the oil absorption retarder of this invention, where a variety of forms including solid, jelly, paste and liquid is allowable. It is preferable to properly select the form according to the object matter to which the oil absorption retarder is to be applied and mode of its utilization.

To offer high oil absorption retarding effects, it is preferable to use a solution in which an alginic ester is dissolved. Similarly, such high oil absorption retarding effects can be brought when a powder type alginic ester is used. The particle size of the powders in such a situation is preferably equal to or less than 125 $\mu$m, more preferably, equal to or less than 110 $\mu$m, and further preferably equal to or less than 100 $\mu$m.

Use of the powder type alginic ester can render the retarder mixed uniformly with powder materials such as flours in a short time before use. If powder materials can be easily, uniformly prepared in advance, products can be easily manufactured with stable quality. Because the dissolving step becomes unnecessary to manufacture the oil absorption retarder where the powder type alginic ester is used, investments for facilities to do dissolution become unnecessary, so that products can be manufactured with less energy and reduced costs. Therefore, the powder type oil absorption retarder can be easily used for manufacturing in small size factories and shops, which have no dissolution facility, and also, can be used advantageously for products for home use.

A method for applying the oil absorption retarder of this invention may properly be selected according to purposes of retarding oil absorption or so. For example, the oil absorption retarder may thoroughly be mixed into the object matter so that the entire part of the object matter will have an uniform retardation effect for oil absorption, or the oil absorption retarder may concentrically be applied to the specific areas so that the final oil contents will differ by areas. It is also allowable to apply the oil absorption retarder at different concentrations to produce areas with various oil contents. In particular in the production of fried foods, areas where toppings to be applied can be designed to have controlled oil contents depending on sources of the toppings, so as to provide good taste of fried foods as a whole while retaining texture of the toppings.

The oil absorption retarder of this invention will find its most effective use in fried foods, but it may also be effective in industrial and agricultural applications besides food-related ones and may have no limitation on object matters to which the retarder is to be applied.

The oil absorption retarder of this invention exerts its effect in retarding oil absorption during frying of the object matter to which the oil absorption retarder is applied. Its effect of retarding oil absorption reaches as high as 30% or more as compared with the case without using the oil absorption retarder of this invention. This effect is ascribable to alginic ester contained in the oil absorption retarder of this invention. Accordingly, if the oil absorption retarder of the invention is used, low calorie foods can be provided with lower costs.

Use of the oil absorption retarder of this invention may further result in effects other than retarding oil absorption. It has confirmed that the oil absorption retarder of this invention used in production of noodles shows effect of preventing noodles from swelling in hot water. It is further expected that the oil absorption retarder of this invention will improve texture when applied to a wide variety of foods.

EXAMPLES

The following paragraphs will describe this invention in detail referring to the preferred Examples. Materials, procedures, ratios, operations and so forth shown in the following examples can properly be altered without departing from the spirit of this invention. Alginic ester used in all Examples described below was DUCK LOID (trade name; a product from KIBUN FOOD CHEMIFA Co., Ltd.).

Example 1

Mixed for one minute were 475 g of flour, 25 g of potato starch and 75 ml of aqueous alginic ester solution. The amount of alginic ester was adjusted to 0%, 0.2%, 0.3% or 0.4% of the total weight of the flour and potato starch. The mixture was further added with 70 ml of aqueous solution in which 7.5 g of common salt, 1.0 g of kansui (trade name KANSUI-S; a product of Organo Corporation), i.e. brine, and 5 g of calcium carbonate were dissolved, and mixed for 9 minutes at 100 rpm. The obtained mixture was then rolled using a noodle roller, cut and waved to produce raw noodle 2 mm in diameter. The raw noodle is then steamed for 3 minutes, dipped in water for 5 seconds, and fried at 140° C. for 2 minutes. The resultant noodle was air-dried to obtain instant noodle. The instant noodle was subjected to individual tests for measuring moisture and oil contents.

The instant noodle was put into a food processor and finely ground. Approx. 10 g of the resultant ground substance was weighed out in a weighing bottle, dried at 105° C. for 4 hours and weighed. Weight loss calculated here was regarded as moisture content of the instant noodle.

Approx. 10 g of thus produced instant noodle was added with 50 ml of methylene chloride, allowed to stand for 90 minutes, and put into a crucible via filtration through filter paper (5A). Then such process was repeated twice in that the extraction residue was added with another 50 ml of methylene chloride, allowed to stand for 30 minutes, and filtered into the crucible in the similar manner. The crucible was heated to vaporize methylene chloride, dried and weighed, to obtain the oil content of the instant noodle. Results were as shown in Table 1. The instant noodle added with alginic ester was free from sticky touch (soft and viscous texture) as has been experienced with the instant noodle without alginic ester, and showed no swelling in hot water with time.

TABLE 1

| Concentration of Alginic Ester | Moisture Content (%) | Oil Content (%) |
| --- | --- | --- |
| none | 3.40 | 19.30 (100.0) |
| 0.2% | 3.30 | 17.41 (90.2) |
| 0.3% | 3.66 | 17.33 (89.8) |
| 0.4% | 3.26 | 16.81 (87.1) |

Water and oil contents are based on weight of the instant noodle. Figures in the parenthesis for oil content denote relative values assuming the oil content of the instant noodle without alginic ester as 100.

Example 2

Mixed for one minute were 475 g of flour, 25 g of potato starch and 100 ml of aqueous alginic ester solution. The amount of alginic ester was adjusted to 0%, 0.2% or 0.4% of the total weight of the flour and potato starch. The mixture was further added with 45 ml of aqueous solution in which 7.5 g of common salt, 1.0 g of kansui (trade name KANSUI-S; a product of Organo Corporation) and 5 g of calcium carbonate were dissolved, and mixed for 9 minutes at 100 rpm. The obtained mixture was then rolled using a noodle roller, cut and waved to produce raw noodle 2 mm in diameter. The raw noodle is then steamed for 3 minutes, dipped in water for 5 seconds, and fried at 140° C. for 2 minutes. The resultant noodle was air-dried to obtain instant noodle.

The obtained instant noodle was subjected to measurement for moisture and oil contents in a similar manner as in Example 1. Results were as shown in Table 2. The instant noodle added with alginic ester was free from sticky touch (soft and viscous texture) as has been experienced with the instant noodle without alginic ester, and showed no swelling in hot water with time.

TABLE 2

| Concentration of Alginic Ester | Moisture Content (%) | Oil Content (%) |
| --- | --- | --- |
| none | 3.52 | 19.45 (100.0) |
| 0.2% | 3.35 | 16.63 (85.5) |
| 0.4% | 3.38 | 16.17 (83.1) |

Water and oil contents are based on weight of the instant noodle. Figures in the parenthesis for oil content denote relative values assuming the oil content of the instant noodle without alginic ester as 100.

Example 3

Twelve grams of shortening was thoroughly kneaded up to creamy form, added with 50 g of sugar and ground using a whisk until the mixture became whitish. Then 24 g of raw egg was added little by little while mixing, and 90 g of water was poured in a gradual manner and mixed. The amount of alginic ester was adjusted to 0%, 0.1%, 0.2%, 0.3% or 0.4% of the weight of the soft flour to be added in the next step. The obtained mixture was further added with 260 g of soft flour, 8 g of skimmilk powder, 2 g of common salt and 10.4 g of baking powder and mixed using a mixer for 3 minutes. The resultant dough was wrapped in wrapping film, allowed to stand for 10 minutes, and rolled 6 times with a roll width of 1 cm. The dough was dusted and rubbed with each 1 g of starch on the both sides and then shaped into a doughnut form with an inner diameter of 4 cm, outer diameter of 6 cm and a height of 0.9 cm. The dough was fried at 180° C. for 3 minutes, removed from the oil, and allowed to cool for 20 minutes to obtain doughnut.

The obtained doughnut was subjected to measurement for moisture and oil contents in a similar manner as in Example 1. Oil contents were measured both before and after frying, and a value which equals to magnification of increase in the oil content subtracted by 1 was defined as relative oil absorption. Results were as shown in Table 3. The doughnut added with alginic ester was found to have a favorable hardness as compared that of the doughnut without alginic ester.

TABLE 3

| Concentration of Alginic Ester | Moisture Content (%) | Oil Content (%) | Relative Oil Absorption |
| --- | --- | --- | --- |
| none | 14.44 | 21.28 (100.0) | 6.91 (100.0) |
| 0.1% | 16.36 | 17.38 (81.7) | 5.70 (82.5) |
| 0.2% | 17.51 | 14.95 (70.3) | 4.27 (61.8) |
| 0.3% | 17.55 | 14.52 (68.2) | 4.24 (61.4) |
| 0.4% | 18.17 | 14.25 (67.0) | 3.62 (52.4) |

Water and oil contents are based on weight of the doughnut. Figures in the parenthesis for oil content and relative oil absorption denote relative values assuming the oil content of the doughnut without alginic ester as 100.

Example 4

In 90 ml of aqueous alginic ester solution, 60 g of batter mixture (trade name TS-43; product of Kyowa Hakko Kogyo Co., Ltd.) was dissolved at 4° C. At that time, the alginic ester was adjusted to have a concentration of 0%, 0.1%, 0.2%, 0.3% or 0.4% with respect to the weight of the batter mixture. The mixture was coated on the both sides of sweet potato slices of 46 mm diameter and 7.5 mm thickness, which was then fried at 160° C. for 1 minute. After cooled, only the coating was collected and subjected to measurement for moisture and oil contents in a similar manner as in Example 1. Results were as shown in Table 4. All of the coating added with alginic ester were found to be excellent in appearance, texture, taste and flavor.

TABLE 4

| Concentration of Alginic Ester | Moisture Content (%) | Oil Content (%) |
| --- | --- | --- |
| none | 32.4 | 25.9 (100.0) |
| 0.1% | 33.1 | 23.3 (90.0) |
| 0.2% | 37.8 | 23.3 (90.0) |
| 0.3% | 36.6 | 15.1 (58.3) |
| 0.4% | 38.8 | 15.4 (59.5) |

Water and oil contents are based on weight of the coating. Figures in the parenthesis for oil content denote relative values assuming the oil content of the coating without alginic ester as 100.

Example 5

Twelve grams of shortening was thoroughly kneaded up to creamy form, added with 50 g of sugar and ground using a whisk until the mixture became whitish. Then 24 g of raw egg was added little by little while mixing, and 90 g of aqueous alginic ester solution was poured in a gradual manner and mixed. This mixture was added to a powdery mixture of 260 g of soft flour, 8 g of skimmilk powder, 2 g of common salt, 10.4 g of baking powder, and 0.52 g of alginic ester (0.2% with respect to the soft flour), and mixed for three minutes by a mixer. As the alginic ester, those having particle sizes that pass through a sieve of 20 to 250 µm as specified in Table 5 were used The resultant dough was wrapped in wrapping film and allowed to stand for 10 minutes, and rolled 6 times with a roll width of 10 cm. The dough was dusted and rubbed with each 1 g of starch on the both sides and then shaped into a doughnut form with an inner diameter of 40 mm, an outer diameter of 60 mm and a height of 9 mm. The dough was fried at 180° C. for 3 minutes, removed from the oil, and allowed to cool for 20 minutes to obtain doughnut.

The obtained doughnut was subjected to measurement for moisture and oil contents in a similar manner as in Example 1. Oil contents were measured both before and after frying, and a value which equals to magnification of increase in the oil content subtracted by 1 was defined as relative oil absorption. Results were as shown in Table 5. The oil absorption retarding effects were turned out as remarkable where the alginic ester having particle sizes equal to or less than 125 µm was added.

TABLE 5

| Particle Size of Alginic Ester (µm) | Moisture Content (%) | Oil Content (%) | Relative Oil Absorption |
|---|---|---|---|
| none | 15.2 | 20.0 (100.0) | 6.90 (100.0) |
| 250 | 16.2 | 18.0 (90.0) | 5.96 (86.4) |
| 177 | 15.8 | 18.3 (91.5) | 6.07 (88.0) |
| 150 | 15.6 | 18.4 (92.0) | 6.13 (88.8) |
| 100 | 16.5 | 17.3 (86.5) | 5.54 (80.3) |
| 75 | 17.4 | 16.1 (80.5) | 5.09 (73.8) |
| 63 | 17.0 | 16.1 (80.5) | 5.01 (72.6) |
| 44 | 16.9 | 15.9 (79.5) | 4.95 (71.7) |
| 20 | 17.4 | 15.6 (78.0) | 4.84 (70.1) |

Water and oil contents are based on weight of the doughnut. Figures in the parenthesis for oil content and relative oil absorption denote relative values assuming the oil content of the doughnut without alginic ester as 100.

Example 6

Except the adding amount of the alginic ester was changed to 1.04 g (0.4% with respect to the soft flour), doughnuts were made with the process substantially the same as that in Example 5.

The obtained doughnut was subjected to measurement for moisture and oil contents in a similar manner as in Example 1. Oil contents were measured both before and after frying, and a value which equals to magnification of increase in the oil content subtracted by 1 was defined as relative oil absorption. Results were as shown in Table 6. The oil absorption retarding effects were turned out as remarkable where the alginic ester having particle sizes equal to or less than 125 µm was added.

TABLE 6

| Particle Size of Alginic Ester (µm) | Moisture Content (%) | Oil Content (%) | Relative Oil Absorption |
|---|---|---|---|
| none | 15.3 | 20.8 (100.0) | 7.10 (100.0) |
| 250 | 16.2 | 18.7 (89.9) | 5.99 (84.4) |
| 177 | 16.6 | 18.1 (78.0) | 5.84 (82.3) |
| 150 | 16.2 | 18.7 (89.9) | 6.06 (85.4) |
| 100 | 17.4 | 16.2 (77.9) | 4.99 (70.3) |
| 75 | 18.1 | 16.2 (77.9) | 5.06 (71.3) |
| 63 | 18.1 | 16.0 (76.9) | 4.98 (70.1) |
| 44 | 18.2 | 15.5 (74.5) | 4.74 (66.8) |
| 20 | 18.1 | 14.9 (71.6) | 4.45 (62.7) |

Water and oil contents are based on weight of the doughnut. Figures in the parenthesis for oil content and relative oil absorption denote relative values assuming the oil content of the doughnut without alginic ester as 100.

Example 7

Mixed as powders were 475 g of flour, 25 g of potato starch and 2.0 of alginic ester (0.4% with respect to the soft flour). As the alginic ester, those having particle sizes that pass through a sieve of 20 to 250 µm were used. The mixture was further added with 145 ml of aqueous solution in which 7.5 g of common salt, 1.0 g of kansui and 5.0 g of calcium carbonate were dissolved, and mixed for ten minutes at 70 rpm. The obtained mixture was then rolled using a noodle roller, cut and waved to produce raw noodle 2 mm in diameter. The raw noodle is then steamed for 3 minutes, dipped in water for 5 seconds, and fried at 140° C. for 2 minutes. The resultant noodle was air-dried to obtain instant noodle.

The oil absorption retarder of this invention has an effect of retarding oil absorption during frying. Thus use of the oil absorption retarder of this invention will facilitate production processes of fried foods with less oil contents. The oil absorption retarder of this invention also has an effect of improving foods texture and retarding swelling of noodle in hot water. Thus the oil absorption retarder of this invention is valuable as an overall modifier for providing desired properties and is expected to be applied in a great variety of fields.

What is claimed is:

1. An oil absorption retarder composition consisting essentially of an aliginic ester and a non-toxic and edible carrier suitable for use in the manufacture of fried food,
    said aliginic ester having a degree of esterification of at least 20% and a viscosity of at least 2 CP in a 1% aqueous solution at 20° C., and
    wherein said aliginic ester is present in said oil absorption retarder composition in an amount of 0.01 to 3 wt parts based on 100 wt parts of said edible carrier, and
    said aliginic ester present in said oil absorption retarder composition has a particle size of 125 µm or less.

2. The absorption retarder composition of claim 1 in solid powder form, wherein said edible carrier is flour and said aliginic ester has a particle size no greater than 100 µm.

3. The oil absorption retarder composition of claim 1 wherein said alginic ester has an esterification degree of at least 50%.

4. The oil absorption retarder composition of claim 3 wherein said alginic ester has an esterification degree of 50–90%.

5. The oil absorption retarder composition of claim 1 wherein said alginic ester has a viscosity of at least 20 CP in a 1% aqueous solution at 20° C.

6. The oil absorption retarder composition of claim 5 wherein said alginic ester has a viscosity of 20–600 CP in a 1% aqueous solution at 20° C.

7. A fried food produced by frying a food homogenously containing an oil absorption retarder composition consisting essentially of an alginic ester and a non-toxic and edible carrier suitable for use in the manufacture of fried food, said alginic ester having a degree of esterification of at least 20% and a viscosity of at least 2 CP in a 1% aqueous solution at 20° C., and wherein said alginic ester is present in said oil absorption retarder composition in an amount of 0.01 to 3 wt parts based on 100 wt parts of said edible carrier, and said aliginic ester present in said oil absorption retarder composition has a particle size of 125 $\mu$m or less.

8. A fried food according to claim 7 in the form of a doughnut.

9. A fried food according to claim 7 in the form of a fried noodle.

10. A fried food according to claim 7 in the form of a fried potato strip coated with said absorption retarder.

11. The fried food of claim 7 wherein said oil absorption retarder composition is applied to said food before frying, in solid powder form, wherein said edible carrier is flour and said alginic ester has a particle size no greater than 110 $\mu$m.

12. The fried food of claim 7 wherein said alginic ester in said oil absorption retarder has an esterfication degree of at least 50%.

13. The fried food of claim 7 wherein said alginic ester in said oil absorption retarder composition has an esterification degree of 50–90%.

14. The fried food of claim 7 wherein said alginic ester in said oil absorption retarder composition has a viscosity of at least 20 cp in a 1% aqueous solution at 20° C.

15. The fried food of claim 7 wherein said alginic ester in said oil absorption retarder composition has a viscosity of 20–600 cp in a 1% aqueous solution at 20° C.

16. A method of retarding oil absorption in the preparation of a fried food, comprising either 1(a) adding to a food an oil absorption retarder composition consisting essentially of an alginic ester and a non-toxic and edible carrier suitable for use in the manufacture of fried food, said alginic ester having a degree of esterification of at least 20% and a viscosity of at least 2 CP in a 1% aqueous solution at 20° C., and wherein said alginic ester is present in said oil absorption retarder composition in an amount of 0.01 to 3 wt parts based on 100 wt parts of said edible carrier, and said alginic ester present in said oil absorption retarder composition has a particle size of 125 $\mu$m or less, and 1(b) frying said food while reducing oil absorption of said food; or 2(a) forming said composition into a shaped food product, and 2(b) frying said shaped food product while reducing oil absorption of said shaped food product.

17. The method of claim 16 wherein said composition is coated on said food.

18. The method of claim 16 wherein said food product is a doughnut and said composition is formed into a doughnut shape prior to said frying.

19. The method of claim 16 wherein said food product is a noodle and said composition is formed into a noodle shape prior to said frying.

20. The method of claim 16 wherein said food is a potato slice and said composition is coated over said potato slice prior to said frying.

21. A method of retarding oil absorption in the preparation of a fried food, comprising either adding a composition 07 claim 2 to a food, and frying said food, or forming said composition into a shaped food product, and frying said shaped food product.

22. A method of retarding oil absorption in the preparation of a fried food, comprising either adding a composition 07 claim 3 to a food, and frying said food, or forming said composition into a shaped food product, and frying said shaped food product.

23. A fried food produced by frying a food consisting of core and skin wherein said skin homogenously contains an oil absorption retarder composition consisting essentially of an alginic ester and a non-toxic and edible carrier suitable for use in the manufacture of fried food, said alginic ester having a degree of esterification of at least 20% and a viscosity of at least 2 CP in a 1% aqueous solution at 20° C., and wherein said alginic ester is present in sad oil absorption retarder composition in an amount of 0.01 to 3 wt parts based on 100 wt parts of said edible carrier, and said aliginic ester present in said oil absorption retarder composition has a particle size of 125 $\mu$m or less.

\* \* \* \* \*